United States Patent
Hagel-Sorensen

(10) Patent No.: US 9,594,729 B2
(45) Date of Patent: Mar. 14, 2017

(54) CONTENT NAVIGATION AND ZOOMING ON A MOBILE DEVICE

(75) Inventor: Christian Neergaard Hagel-Sorensen, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 265 days.

(21) Appl. No.: 13/220,731

(22) Filed: Aug. 30, 2011

(65) Prior Publication Data
US 2013/0055077 A1 Feb. 28, 2013

(51) Int. Cl.
G06F 17/00 (2006.01)
G06F 17/21 (2006.01)
G06F 3/0482 (2013.01)
G06F 3/0484 (2013.01)

(52) U.S. Cl.
CPC .......... *G06F 17/212* (2013.01); *G06F 3/0482* (2013.01); *G06F 3/0484* (2013.01); *G06F 2203/04806* (2013.01)

(58) Field of Classification Search
CPC .............................. G06F 17/212; G06F 17/211
USPC ........................................................ 715/273
See application file for complete search history.

(56) References Cited

U.S. PATENT DOCUMENTS

| | | | |
|---|---|---|---|
| 5,615,384 A | 3/1997 | Allard et al. | |
| 5,737,599 A | 4/1998 | Rowe et al. | |
| 6,037,939 A * | 3/2000 | Kashiwagi | G06F 3/038 715/767 |
| 6,353,824 B1 | 3/2002 | Boguraev et al. | |
| 7,441,207 B2 | 10/2008 | Filner et al. | |
| 7,444,598 B2 | 10/2008 | Horovitz et al. | |
| 7,469,381 B2 | 12/2008 | Ording | |
| 7,542,845 B2 | 6/2009 | Sands et al. | |
| 8,001,466 B2 * | 8/2011 | Kobayashi | 715/243 |
| 2001/0007980 A1 * | 7/2001 | Ishibashi | G06F 1/1626 705/14.4 |

(Continued)

FOREIGN PATENT DOCUMENTS

| | | |
|---|---|---|
| CN | 1537265 A | 10/2004 |
| CN | 101853127 A | 10/2010 |

OTHER PUBLICATIONS

"Windows® Internet Explorer® Moble on Windows Phone 7", Dec. 2010, Retrieved from http://download.microsoft.com/download/9/3/5/93565816-AD4E-4448-B49B-457D07ABB991/Windows%20Internet%20Explorer%20Mobile%20on%20Windows%20Phone%207_FINAL_122010.pdf, 5 pp.

(Continued)

*Primary Examiner* — Laurie Ries
(74) *Attorney, Agent, or Firm* — Michael David Ream; Tom Wong; Micky Minhas

(57) ABSTRACT

The contents displayed on the touch screen of a mobile device are modified based in user input, in the form of touch input. In one mode, a content view, contents of a document are displayed to a user at various zoom levels. The user can zoom-out by indicating in one embodiment a pinching touch motion. The user can also switch to another viewing mode, a structure view, where structure of the document is displayed to the user, potentially at various zoom levels. The user can zoom-out in the structure view also by providing a pinching touch motion. The user can switch to the content view by selecting text in the structure view, which then presents the contents of the document at the corresponding location.

16 Claims, 6 Drawing Sheets

(56) References Cited

U.S. PATENT DOCUMENTS

| | | | |
|---|---|---|---|
| 2003/0190158 A1* | 10/2003 | Roth | G06T 3/40 |
| | | | 386/241 |
| 2005/0270311 A1* | 12/2005 | Rasmussen | G01C 21/32 |
| | | | 345/677 |
| 2007/0168370 A1* | 7/2007 | Hardy | G06F 17/30241 |
| 2007/0200820 A1 | 8/2007 | Svensson et al. | |
| 2007/0245238 A1* | 10/2007 | Fugitt | G06F 3/0481 |
| | | | 715/700 |
| 2008/0276178 A1* | 11/2008 | Fadell | G02B 27/017 |
| | | | 715/733 |
| 2008/0309632 A1 | 12/2008 | Westerman et al. | |
| 2009/0031246 A1* | 1/2009 | Cowtan | G06Q 50/16 |
| | | | 715/786 |
| 2009/0066728 A1 | 3/2009 | Ording | |
| 2009/0073132 A1 | 3/2009 | Lee et al. | |
| 2009/0183112 A1* | 7/2009 | Higgins | G06Q 30/02 |
| | | | 715/808 |
| 2009/0193337 A1 | 7/2009 | Carter et al. | |
| 2009/0287994 A1* | 11/2009 | Ichino | 715/234 |
| 2009/0322790 A1 | 12/2009 | Behar et al. | |
| 2010/0005418 A1* | 1/2010 | Miyazaki | G06F 3/04883 |
| | | | 715/823 |
| 2010/0235724 A1* | 9/2010 | Koyano | H04N 1/393 |
| | | | 715/221 |
| 2010/0283743 A1* | 11/2010 | Coddington | G06F 3/0485 |
| | | | 345/173 |
| 2011/0047504 A1 | 2/2011 | Wienands et al. | |
| 2012/0124505 A1* | 5/2012 | St. Jacques, Jr. | G06F 3/0483 |
| | | | 715/776 |
| 2012/0198384 A1 | 8/2012 | Kumamoto | |
| 2013/0080884 A1 | 3/2013 | Lisse et al. | |
| 2013/0326398 A1* | 12/2013 | Zuverink | G06F 3/048 |
| | | | 715/784 |

OTHER PUBLICATIONS

Xiang et al., "Effective Page Segmentation Combining Pattern Analysis and Visual Separators for Browsing on Small Screens," Dec. 18, 2006, Proceedings of the IEEE/WIC/ACM International Conference on Web Intelligence, pp. 831-840.

Wu, et al., "Touchware: A Software based Implementation for High Resolution Multi-touch Applications", Retrieved at <<http://ieeexplore.ieee.org/stamp/stamp.jsp?tp=&arnumber=5577964>>, 10th IEEE International Conference on Computer and Information Technology, Jun. 29-Jul. 1, 2010, pp. 1703-1710.

Hurst, et al., "Navigating VR Panoramas on Mobile Devices", Retrieved at <<http://ieeexplore.ieee.org/stamp/stamp.jsp?tp=&arnumber=5190774>>, 13th International Conference Information Visualisation, Jul. 15-17, 2009, pp. 203-209.

U.S. Notice of Allowance dated Dec. 16, 2013 in U.S. Appl. No. 13/241,227.

U.S. Official Action dated Feb. 15, 2013 in U.S. Appl. No. 13/241,227.

U.S. Official Action dated Aug. 29, 2013 in U.S. Appl. No. 13/241,227.

Chinese Official Action dated Nov. 19, 2014 in Chinese Application No. 201210356858.2.

* cited by examiner

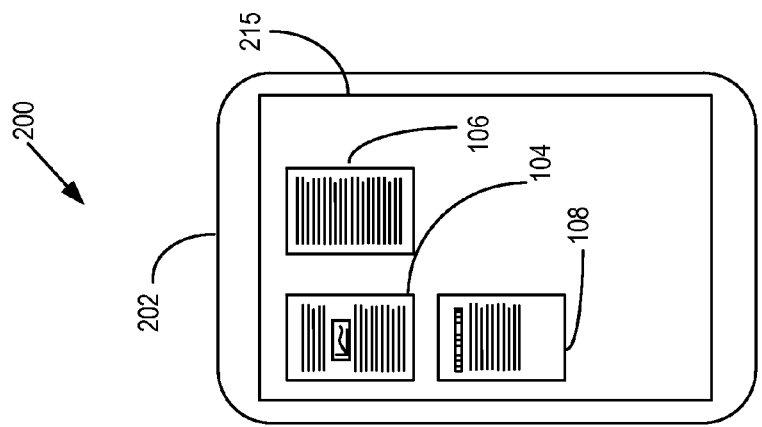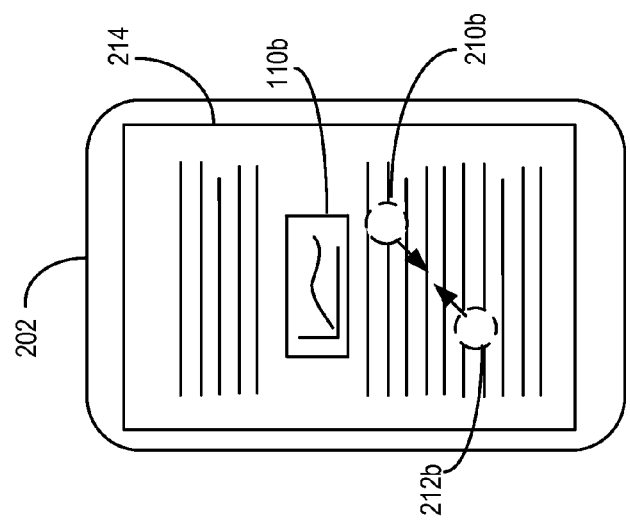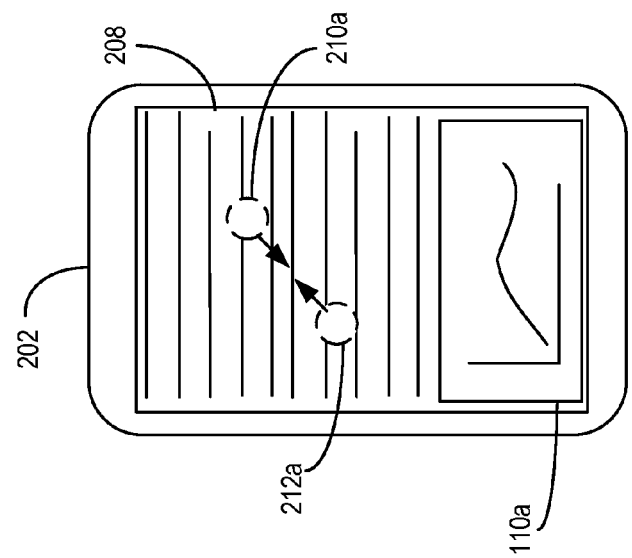

CONTENT NAVIGATION AND ZOOMING ON A MOBILE DEVICE

BACKGROUND

Mobile devices with touch display screens are presently in wide use, and are found in tablet computers, smart phones, personal digital assistants, e-book readers, and similar portable computing devices. Many of these devices are characterized by incorporating a relatively small screen, but which can be suitable for user interaction with a given application program. However, the small size of the screen can impact how the user interacts with the device. Specifically, the limited size of the display screen requires modification as to how the application program displays information, and how the user interacts with the application. In some instances, merely executing the same application program designed for a laptop or desktop computer on a mobile device is not satisfactory.

Desktop applications may allocate an area on the screen for presenting different types of information. For example, application programs designed for laptop/desktop operation may allow the user to simultaneously view content being developed by the user in a document (e.g., a text based word processing document), as well as provide other information about the content, e.g., its overall structure. The application may dedicate different areas of the screen for presenting these different, but related, types of information. The limited screen size of the mobile device frequently does not facilitate presenting information in the same manner. In many cases, the small screen size would result in the different areas being illegible to the viewer.

It is with respect to these and other considerations that the disclosure made herein is presented.

SUMMARY

Concepts and technologies are described herein directed to displaying different viewing modes for information associated with document on a mobile device. In a content viewing mode, content of a document can be viewed at different zoom levels. In a structure viewing mode, structure associated with the document can be viewed, possibly at different zoom levels. Using these two modes, along with a mechanism to easily switch between these two modes, information about both the content and structure of a document can be presented over a device with a small screen, such as a mobile computing device.

In one embodiment, a method is disclosed for an application program to modify information displayed on a mobile device. The operations involve displaying on the mobile device by an application program a first portion of a document and receiving input from the user where the input includes an input to a touch screen of the mobile device. The device then retrieves from memory data indicating the structure of the document ("document related structure") and displays on the mobile device by the application program at least a portion of the document-related structure in place of the first portion of the document.

In another embodiment, a system modifies information displayed on a mobile device and includes a memory configured to store a document and document-related structure data associated with the document. The mobile device also comprises a display comprising a touch screen and a central processing unit that is configured to receive user input, and execute an application program that can manipulate the document and present at least a portion of the document on the display. The central processing unit is further configured to display a first portion of the document on the display, receive input from the user, the input comprising an input to the touch screen, retrieve the document-related structure data from the memory, and display on the mobile device at least a portion of the document-related structure data in place of displaying the first portion of the document.

In another embodiment, a computer readable medium stores instructions which when executed cause a central processing unit to present at least a portion of a document on a display of a mobile device and receive an input from the user, where the input comprises an input to a touch screen of the mobile device requesting to change from a content view to a structure view. The instructions further cause the processor to retrieve a document-related structure data associated with the document from a memory of the mobile device and display on the mobile device at least a portion of the document-related structure data in place of displaying the first portion of the document.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIGS. 2A-2C are illustrations of a mobile device presenting various displays of content of a document according to one embodiment disclosed herein;

DETAILED DESCRIPTION

Figure 1:
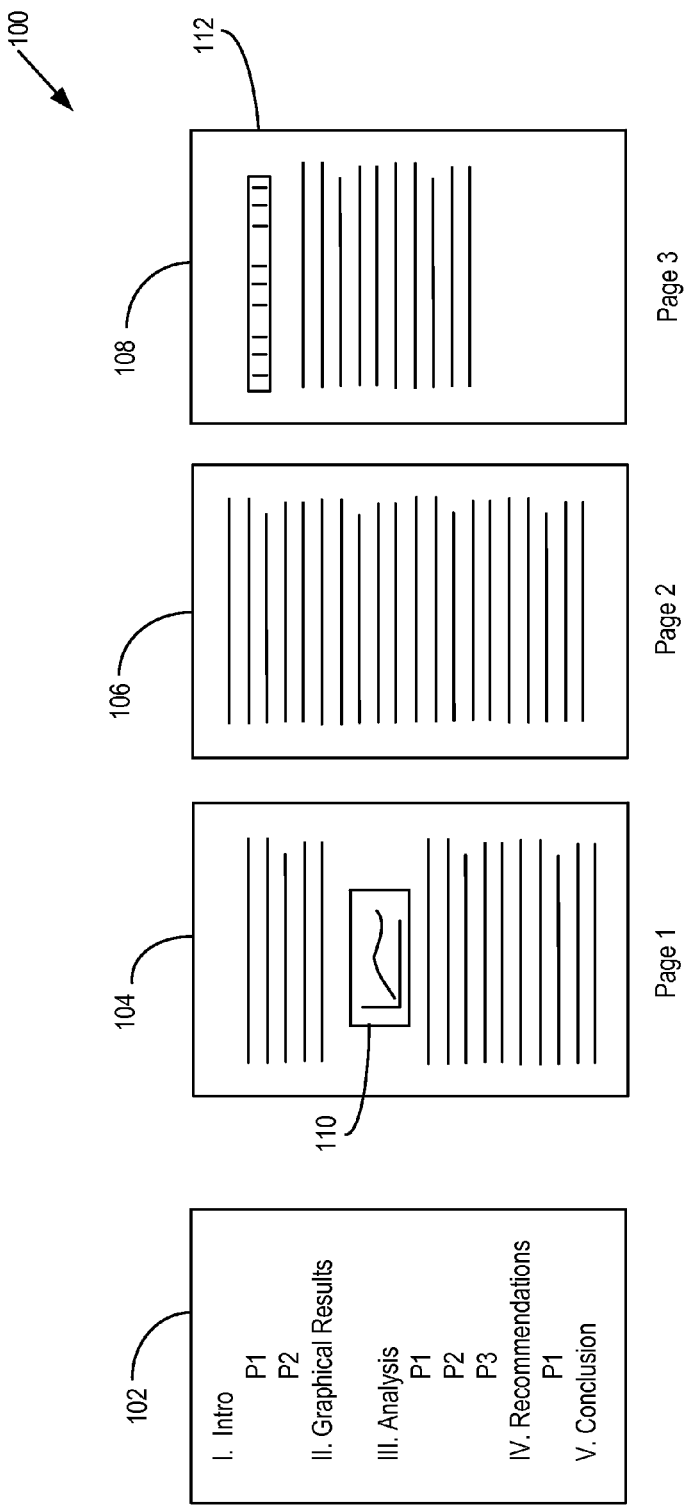
FIG. 1 is a logical representation of a document and associated document-related structure data provided in one embodiment presented herein.

The following detailed description is directed to displaying different viewing modes for information associated with a document on a mobile device. In the following detailed description, references are made to the accompanying drawings that form a part hereof, and which are shown by way of illustration specific embodiments or examples. Referring now to the drawings, in which like numerals represent like elements throughout the several figures, aspects of switching viewing modes on a mobile display will be presented.

Presenting information on a mobile device having a small display can present unique challenges. The size of a "small display" on a mobile device is relative, and typically this would encompass devices such as smart phones, personal digital assistants, cameras, e-book readers, etc. Devices with comparatively larger screen displays, such as tablet computers may also benefit from the principles disclosed herein. Typically, but not necessarily, these types of devices have touch screens, because their small size can render impractical using dedicated, physical keys. Although a laptop is considered a mobile device, it may not have a small screen, and would appear more similar in operation to a desktop display. Further, a laptop would also typically have a dedicated keyboard. Thus, for purposes of illustration, the mobile devices referenced herein are assumed to have a relatively small display screen and a touch screen, and are contrasted to other computer devices having a larger screen and physical keyboards, such as a desktop computer.

An application running on a desktop computer (or other device with a large screen) is able to present different types of information about a document on the screen. "Document" refers to any type of word-processing, spreadsheet, graphical, video, or other type of user created file, whether created by the user of the mobile device, or another user. Thus, the document could be a letter created by a word processing application, a spreadsheet creating by a spreadsheet application, graphic slide presentation created by a presentation application, etc.

An application executing on a desktop may present information in different areas of the display simultaneously that represents different types of information about the document. Typically, the main area of the display screen is used by the application to present the document's content. Content is information in the document itself. Thus, for a word processing application, the content would be text and associated formatting provided by the user. The application may also present information about the document's structure (a.k.a. "structure") about the document in another area of the display.

Document-related structure information or document-related structure data may be based on headings created by the user in the document, or using an outline based on headings, titles, table of contents, etc. that are present in the document. Typically, the document-related structure data is derived from text within the document, and generated by the application based on the document. The document-related structure data is useful to allow the user to quickly navigate to different parts of the content in the document.

Some applications may allocate a dedicated area on the side portion of the screen to display document-related structure information simultaneously with the content. The document-related structure information can be generated not only by word processing applications, but slide presentation applications, note generating applications, spreadsheet applications, etc. The document-related structure information can be presented in various ways.

An embodiment of a document illustrating distinct content and document-related structure data is shown in FIG. 1. FIG. 1 is a logical representation of a document, which is used to illustrate the concepts disclosed herein, and which can be applied to different type of applications and documents.

For convenience of illustration, the document in FIG. 1 is assumed to be a word processing document. In FIG. 1, the content is represented by three pages—page one 104, page two 106, and page three 108. These pages represent content created by the user using the application, and for illustration purposes, incorporate an embedded chart 110 on page one 104. Page two 106 comprises text only, and page three 108 incorporates a table 112. The document may include in its contents various headings (not shown in the pages 104, 106, and 108).

An application program may be configured to extract the headings and create information about the document's structure 102, called document-related structure data, which is shown as a separate page of information, but which is not required to be formatted as a page. In some embodiments, the document-related structure data 102 is created from content by the application program using the document, or other sources. The structure is useful to allow the user to quickly navigate the content, or to inform the user as to where the content is located relative to the rest of the document.

Many desktop application programs may present a portion of the content, e.g., page one, along with the document-related structure data 102 in a different portion of the display. This simultaneous presentation allows the user to quickly ascertain a context of what portion they are viewing. However, mobile devices with small screen have a practical limit as to how much information can be legibly presented. Thus, the technique used by the desktop application to divide the screen into different areas (content and structure related information) cannot be readily applied to a mobile device. Further, even the techniques used by a desktop for presenting content itself to a user may not be applicable to presenting the same content on a mobile device.

One approach for presenting content to a user on a mobile device is shown in FIGS. 2A-2C. In this embodiment the mobile device 202 has a screen display 208, which also is a touch screen. Thus, the mobile device 202 is able to detect user input provided by touching the screen with one, two, or more fingers. The mobile device is also typically equipped with an accelerometer, which can detect orientation and movement of the device. Thus, the mobile device can detect motion associated with the user touching the screen. For example, the mobile device can distinguish between a light touch by a user's finger and a heavy touch. The latter is likely to move the device, and this can be detected by the accelerometer, allowing the device to distinguish between the two touches. Different functions can be allocated to these different types of input.

In FIG. 2A, the display 208 displays a portion of the first page (page one 104) of the document. As evident, the mobile device is displaying the entirety of the chart 110a which was present on page one 104, but not the entirety of the first page 104. In order to provide context for the user as to where they are within the content, the user can indicate a "pinching" motion for zooming out of the content. The pinching motion is illustrated in FIG. 2A as two dotted line circles 210a, 212a, which represent locations where the user is touching the touch screen, and simultaneously moving their fingers together. The application interprets this as a zoom-out indication. In FIG. 2B, the mobile device 202 then presents the document in display 214. As can be seen, the chart 110b is still present, but at a smaller size.

The user can also indicate a pinching motion to zoom-out at this point when the display associated with FIG. 2B is shown. The pinching motion is illustrated in FIG. 2B as two dotted line circles 210b, 212b. This would result in the display of FIG. 2C presented. In FIG. 2C the mobile device 202 displays on display 215 the three pages 104, 106, and 108 of the document. In the embodiment of FIG. 2C, the text lines may not be individually legible, but are shown as lines to provide context to the user as to where the current location is with respect to the rest of the content. There may be practical limits as to how far out the application will allow the content to be zoomed out. For example, the application may preclude zooming out any further from the contents present in FIG. 2C.

A reverse pinching motion, i.e., an expansion motion, can be provided by the user to navigate content in the reverse direction, namely from FIG. 2C to FIG. 2B, and then to FIG. 2A. Although three levels of zooming are illustrated, additional levels of zooming may be provided for by the application.

In FIGS. 2A-2C the ability to zoom-in or zoom-out of the content is one approach for informing the user as to the context, which can be an aid to the user in navigation. This may require, however, multiple inputs to indicate zoom-in or zoom-out. For example, to properly appreciate the context of the content shown in FIG. 2A, the user may have to indicate multiple zoom-out requests to arrive at the display at FIG. 2C, and then indicate multiple zoom-in request to arrive back at FIG. 2A. Further, the information provided in FIG. 2C still does not provide the structure information 102 illustrated in FIG. 1

In one embodiment, an application changes the information presented from the content of the document to a corresponding location of the structure view. These can be described as a content view (or content viewing mode) and a structure view (or structure viewing mode). In the former mode, the content is presented whereas in the latter mode, the document-related structure data is presented. For example, returning to FIG. 2C, the entire contents of the document is presented to the user. Thus, FIG. 2C is a content view.

Figure 3B:
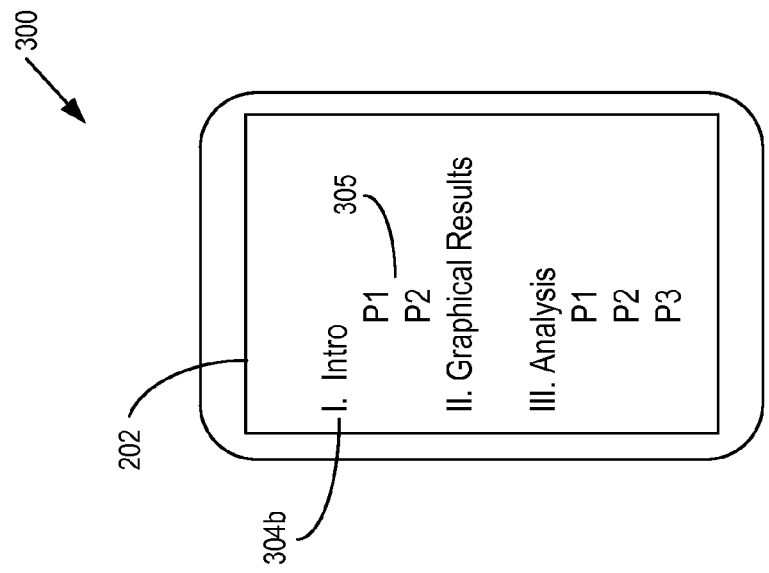
FIGS. 3A-3B are illustrations of a mobile device presenting various displays of document-related structure data associated with a document according to one embodiment disclosed herein.
Figure 3A:
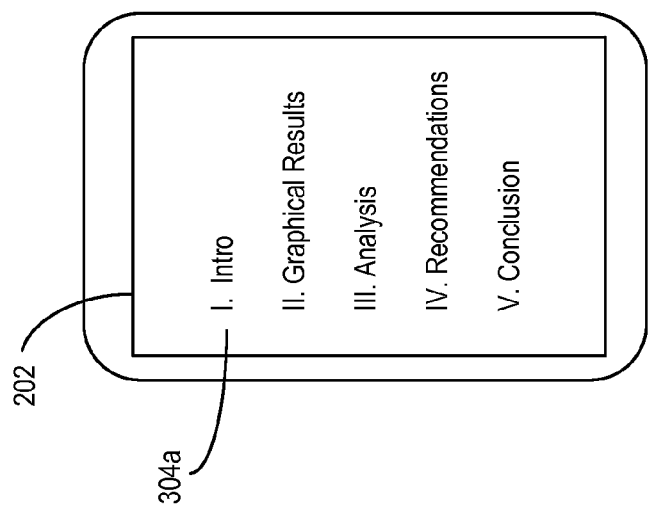

One embodiment for changing from a content view to a structure view is for the application to accept a touch input, which is defined by the application as changing the view displayed from a content view to a structure view. A user could request switching from the content view to the structure view shown in FIG. 3A. The structure view of FIG. 3A shows the display 202 with the complete structure information 304, comprising all the section headings of the document. Since the user was previously viewing the entire contents, the corresponding structure view could present the entire structure.

The user can also zoom-in and view additional information in the structure view, which is not presented in the view of FIG. 3A. This can be accomplished by expanding the display screen and the resulting image of FIG. 3B is shown to the user. In FIG. 3B, the display 202 includes a portion of the initial high level structure 304*b* as shown in FIG. 1A, but also includes secondary level information 305. In other embodiments, there may be additional (or fewer) levels of structure detail shown. The user can zoom-out when viewing the structure information by performing the aforementioned pinching motion.

The input provided by the user to switch from a content view to a structure view can be in one embodiment in the form of a two-finger simultaneous tap, referred to herein as a "double tap." Reference to the term "double tap" this should not be confused with another type of input comprising a single finger rapidly tapping the screen twice in succession. Typically, the double tap is accomplished by using the forefinger and middle finger to touch two areas of the screen simultaneously. However, other fingers can be used, or other forms of input could be used to indicate a switch from a content view to a structure view. In devices which have, e.g., a physical function key, pressing this key could indicate switching views. However, touch screen devices typically have a limited number of physical keys that could be assigned for this purpose.

The double tap input is construed by the application as escaping from the content view to the structure view. If the user is already in the structure view, then a double tap could be interpreted to be another function, or it could be interpreted as a request to remain in the structure view, or even a request to change to a content view.

The user can provide input that can request changing from the structure view to the content view. This is accomplished by the user selecting text in the structure view. The user could select text on the structure view (e.g., a heading or section identifier), and the application would then display that content in the content view. The indication of a selection can occur using a "single tap" input, which comprises a single finger tapping a location once to indicate the desired text in the structure view.

If there are different zoom levels for the content view, then either a default zoom level for displaying the content could be used, or a corresponding zoom level could be used when switching to the content view. For example, if the user selected the "Intro" text in the structure view of FIG. 3A, then the corresponding content view may be that of FIG. 2C. On the other hand, if the same "Intro" text in FIG. 3B is selected for switching back to a content view, the corresponding content view may be that of FIG. 2A. Other embodiments may employ other algorithms.

Figure 4:
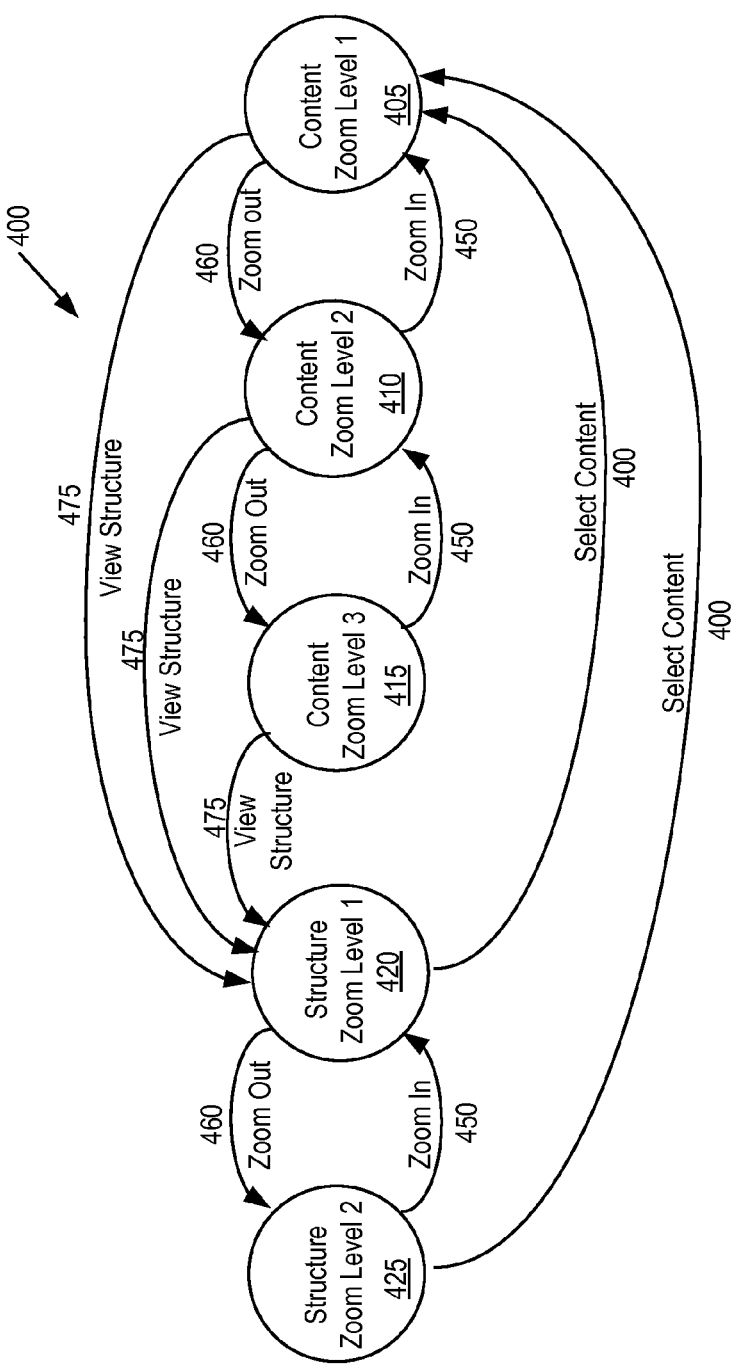
FIG. 4 is a state diagram illustrating a state machine showing various state transitions of information displayed in response to user input according to one embodiment disclosed herein.

A representation of the different display states that can be offered to a user by an application are illustrated by the state machine 400 shown in FIG. 4. It should be appreciated that the logical operations described herein with respect to FIG. 4 and the other FIGURES are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof. It should also be appreciated that more or less operations may be performed than shown in the FIG. 4 and described herein. These operations may also be performed in a different order than those described herein.

As with conventional state diagrams, inputs are associated with state transition arrows, i.e., an arrow indicating movement from one state to another state. To avoid confusion, FIG. 4 does not use any leads with the numerical indicators.

In FIG. 4, there are various states, which can be divided into a content view comprising three states 405, 410, and 415, and a structure view, comprising two states 420 and 425. Each of these states is associated with presenting information at a certain zoom level. For example, Content Zoom Level 1 405 is the most detail view of the content view, and Content Zoom Level 2 410 is the next most detailed, and Content Zoom Level 3 415 is the least detailed. Similarly, Structure Zoom Level 1 420 is more detailed than Structure Zoom Level 2 425.

Moving from one display state to another (e.g., within a content view or a structure view) is accomplished by either zoom-in or zoom-out. The request to zoom-out is designated as line 460, and could be indicated by the aforementioned pinching input. Thus, for example, when in Content Zoom Level 2 410, a pinch input would be a zoom out input 460, which would transition to the Content Zoom Level 3 415. Similarly, to zoom out, corresponding input could be received which would transition the view from e.g., Content Zoom Level 3 down to Content Zoom Level 2.

To transition from a content view to a structure view, the request for structure view 475 can be provided at any of the content zoom levels 405, 410, and 415. This input would transition, for example, the user from Content Zoom Level 1 405 to the Structure Zoom Level 1 420 via input 475. The reverse transition can be accomplished by the user selecting text in the document-related structure data indicating what content is to be presented. This input 400 would transition the user from Zoom Level 1 420 to Content Zoom Level 1 405. Depending on the content selected, the user could transition to other zoom levels (not shown). In addition the transition from Structure Zoom Level 2 425 via select content 400 input transitions to the Content Zoom Level 1 state as a default content zoom level state. Other embodiments may allow transitioning to other zoom levels, as previous discussed above.

Figure 5:
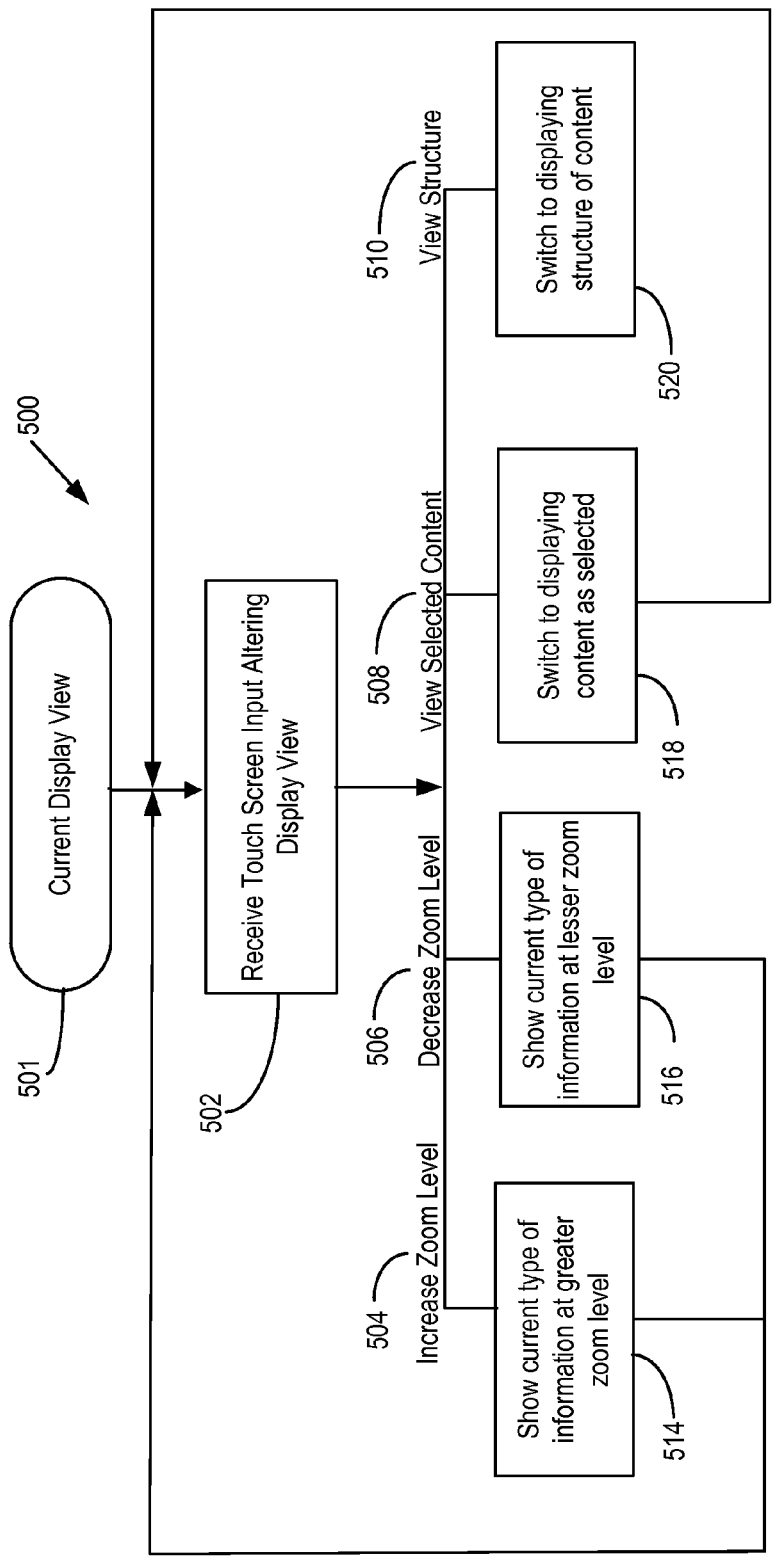
FIG. 5 is a flow diagram illustrating processing of user input and display formats in response thereof according to one embodiment presented herein.

One embodiment of the process flow for the mobile device to process an input altering the display state is shown in FIG. 5. In FIG. 5, the process 500 begins with the display view associated with a current state 501. This could be a content or structure view, and at one of the various zoom levels. At operation 502 the device receives input from the user comprising one of the aforementioned touch inputs. If the input is a request to increase the zoom level 504, and it is possible to increase the zoom level, then in operation 514 the same type of information (e.g., structure or content) is shown at the greater zoom level. If the input is for decreasing the zoom level 506, and it is possible to decrease the zoom level, then in operation 516 the current type of information is shown at a reduced zoom level.

If the input is for viewing selected content 508, which presumes the current view is a structure view, then the operation 518 occurs which switches from the structure view to display the content view. Various algorithms can be defined for which of the plurality of zoom levels can be selected. If the input is for viewing structure 510, which presumes the current view is a content view, then operation 520 occurs which switches from the content view to display the structure view.

In each case, namely operations 514, 516, 518, and 520, the process flow returns to operation 502. There, another touch input can be processed in a similar manner.

Those skilled in the art will recognize that variations on the above are readily possible. For example, it may be also possible to switch to the structure view from the content view by requesting to zoom out from the highest zoom level. Specifically, if the highest zoom level of the content is currently presented to the user, another zoom-out request from the user could switch from display view to the structure view. Similarly, when viewing the most detailed structure zoom level, and the user requests a lower level of detail, the device could switch to a content view. Those skilled in the art will be able to develop other variations in light of the present disclosure.

Figure 6:
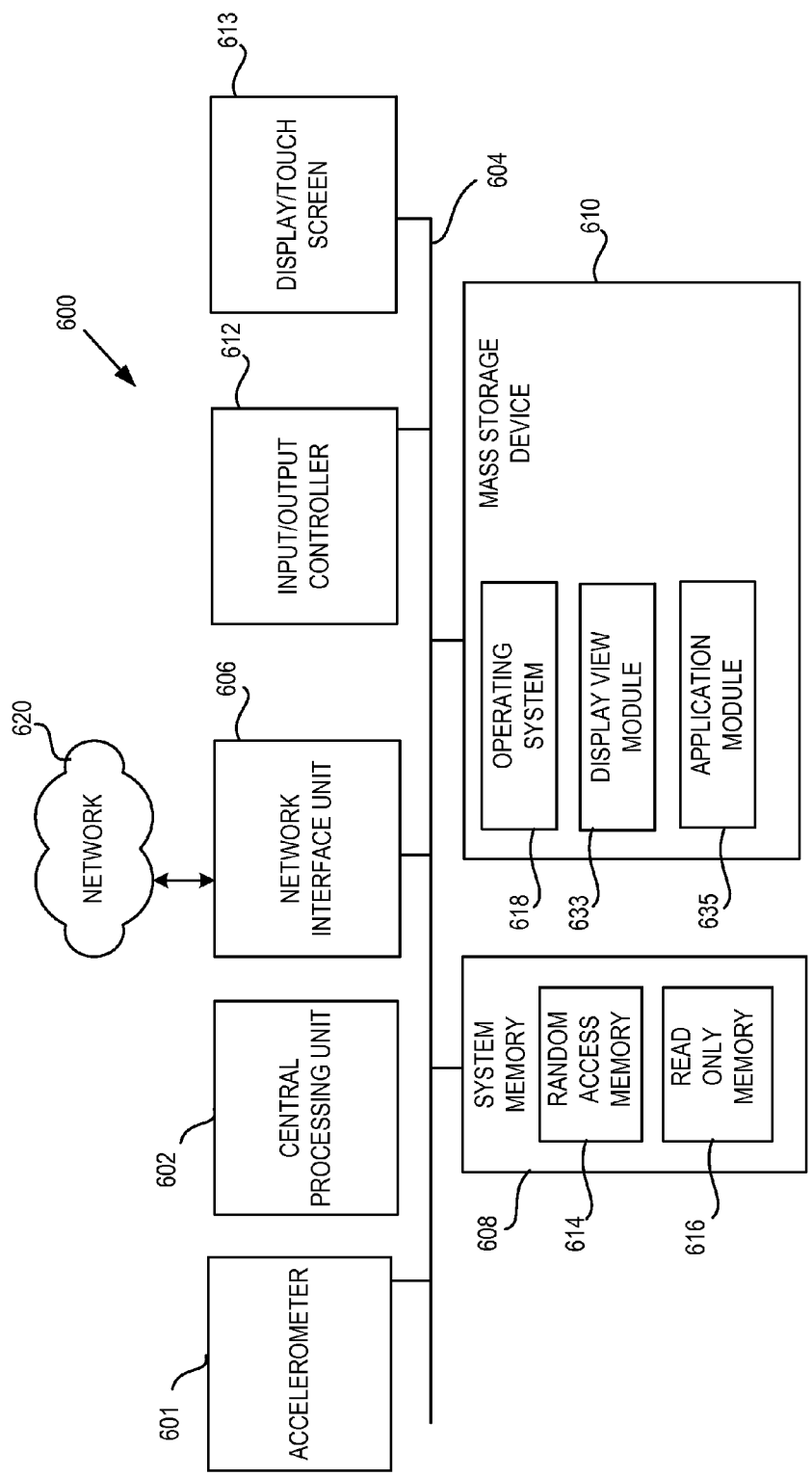
FIG. 6 is a mobile device architecture diagram showing an illustrative computer hardware and software architecture for a mobile device capable of implementing the embodiments presented herein.

FIG. 6 discloses one embodiment of a mobile device for executing instructions for the above identified processes. Turning to FIG. 6, it discloses an illustrative mobile computing device architecture for a computing device 600 capable of executing the software components described herein for altering the view based on user input. The computer architecture shown in FIG. 6 illustrates a conventional mobile computing device that may be utilized to execute any of the various software components described herein. The mobile device can be any of the various forms of cellular telephones with a screen, a smart phone, personal digital assistant, e-book reader, tablet type computing device, digital cameras having touch screens, or other similar type of consumer electronics device having a display screen that is smaller than a conventional desktop computer monitor or laptop display screen. While it is not necessary to rely on a touch screen, many of such mobile devices do incorporate a touch screen.

The computer architecture shown in FIG. 6 includes a central processing unit 602 ("CPU"), a system memory 608, including a random access memory 614 ("RAM") and a read-only memory ("ROM") 616, and a system bus 604 that couples the memory to the CPU 602. The CPU 602 can be a single processor integrated circuit, including those processors which are dedicated or optimized to processing graphic data, such as, but not limited to a graphical processing unit, A basic input/output system ("BIOS") containing the basic routines that help to transfer information between elements within the computer 600, such as during startup, is stored in the ROM 616, A combination display/touchscreen 613 allows the CPU 602 to display information to the user, as well as receive touch based inputs from the user.

The computer 600 further includes a mass storage device 610 for storing an operating system 618, application programs, and other program modules, which will be described in greater detail below. The mass storage device 610 is connected to the CPU 602 through a mass storage controller (not shown) connected to the bus 604. The mass storage device 610 and its associated computer-readable media provide non-volatile storage for the computer 600. Although the description of computer-readable media contained herein refers to a mass storage device, such as a hard disk or CD-ROM drive, it should be appreciated by those skilled in the art that computer-readable storage media can be any available computer storage media that can be accessed by the computer 600.

By way of example, and not limitation, computer-readable storage media may include volatile and non-volatile, removable and non-removable media implemented in any method or technology for storage of information such as computer-readable instructions, data structures, program modules or other data. For example, computer-readable storage media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other non-transitory medium which can be used to store the desired information and which can be accessed by the computer 600.

According to various embodiments, the computer 600 may operate in a networked environment using logical connections to remote computers through a network such as the network 620. The computer 600 may connect to the network 620 through a network interface unit 606 connected to the bus 604. It should be appreciated that the network interface unit 606 may also be utilized to connect to other types of networks and remote computer systems. The computer 600 may also include an input/output controller 612 for receiving and processing input from a number of other devices, including a keyboard, mouse, or electronic stylus (not shown in FIG. 6). Similarly, an input/output controller may provide output to a display screen, a printer, or other type of output device (also not shown in FIG. 6).

As mentioned briefly above, a number of program modules and data files may be stored in the mass storage device 610 and RAM 614 of the computer 600, including an operating system 618 suitable for controlling the operation of a networked desktop, laptop, or server computer. The mass storage device 610 and RAM 614 may also store one or more program modules. In particular, the mass storage device 610 and the RAM 614 may store a display view module 633 capable of implementing the functionality described above for processing inputs from the user and adjusting the screen zoom level and view. The mass storage device 610 and RAM 614 may also store other program modules and data, such as the data structures and databases described above including application program module 635. In various embodiments, the application program module 635 may cooperation with the display view module 633. In other embodiments, the display view module 633 could be incorporated into the operating system 618 or the application program module 635. In various embodiments, the application program module could be a slide presentation application program module, a word processing application program module, or various other forms, including those previously identified herein.

In general, software applications or modules may, when loaded into the CPU 602 and executed, transform the CPU 602 and the overall computer 600 from a general-purpose computing system into a special-purpose computing system customized to perform the functionality presented herein. The CPU 602 may be constructed from any number of transistors or other discrete circuit elements, which may individually or collectively assume any number of states. More specifically, the CPU 602 may operate as one or more finite-state machines, in response to executable instructions contained within the software or modules. These computer-executable instructions may transform the CPU 602 by specifying how the CPU 602 transitions between states, thereby physically transforming the transistors or other discrete hardware elements constituting the CPU 602.

Encoding the software or modules onto a mass storage device may also transform the physical structure of the mass storage device or associated computer readable storage media. The specific transformation of physical structure may depend on various factors, in different implementations of this description. Examples of such factors may include, but are not limited to: the technology used to implement the computer readable storage media, whether the computer readable storage media are characterized as primary or secondary storage, and the like. For example, if the computer readable storage media is implemented as semiconductor-based memory, the software or modules may transform the physical state of the semiconductor memory, when the software is encoded therein. For example, the software may transform the states of transistors, capacitors, or other discrete circuit elements constituting the semiconductor memory.

As another example, the computer readable storage media may be implemented using magnetic or optical technology. In such implementations, the software or modules may transform the physical state of magnetic or optical media, when the software is encoded therein. These transformations may include altering the magnetic characteristics of particular locations within given magnetic media. These transformations may also include altering the physical features or characteristics of particular locations within given optical media, to change the optical characteristics of those locations. Other transformations of physical media are possible without departing from the scope and spirit of the present description, with the foregoing examples provided only to facilitate this discussion.

Based on the foregoing, it should be appreciated that a user can request to switch from a content view to a structure view, as well as zoom-in or zoom-Out within a particular view. It should also be appreciated that the subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A method for an application program to modify information displayed on a device, comprising:
   displaying on the device by the application program at least a first portion of a document at a first content zoom level;
   receiving on the device a first input from a user;
   responsive to receiving the first input, retrieving from a memory in the device document-related structure data associated with the document, the document-related structure data being derived from text within the document corresponding to at least one of a heading, a title or a table of contents;
   displaying on the device by the application program an outline having a primary level of information based on at least a first portion of the document-related structure data corresponding to the first content zoom level, the outline replacing the display of at least the first portion of the document;
   receiving on the device a second input from the user comprising a request to display a secondary level of information based on at least a second portion of the document-related structure data; and
   displaying on the device the secondary level of information within the displayed outline based on the request to display the secondary level of information.

2. The method of claim 1, further comprising:
   prior to receiving the input from the user requesting to change from a content view to a structure view, receiving a third input from the user comprising a request to zoom-out from the document; and
   displaying at least a second portion of the document, wherein the second portion displayed is a superset of the first portion of the document.

3. The method of claim 2, wherein the device further comprises a touch screen, and
   wherein the third input from the user comprises a finger-pinching movement of two fingers on the touch screen.

4. The method of claim 1, wherein the device further comprises a touch screen, and
   wherein the first input comprises tapping the touch screen with two fingers simultaneously.

5. The method of claim 4, further comprising:
   receiving a third input from the user after displaying at least the first portion of the document-related structure data, wherein the third input selects a text portion within the document-related structure data, wherein said text portion corresponds to a heading within the document; and
   displaying on the device by the application program in place of the document-related structure data at least a portion of the document comprising the heading.

6. The method of claim 5, wherein the device further comprises a touch screen, and
   wherein the third input comprises a single tap on the touch screen of a finger of the user.

7. The method of claim 1, wherein the document comprises a series of slides and the application program comprises a slide presentation application program.

8. A system to modify information displayed on a device comprising:
- a memory configured to store a document and document-related structure data associated with the document, the document-related structure data being derived from text within the document and based on at least one of a heading, a title or a table of contents;
- a display; and
- a central processing unit configured to receive user input and execute an application program configured to manipulate the document and present at least a portion of the document on the display and to further configure the central processing unit to
    - display a first portion of the document at a first content zoom level on the display,
    - receive a first input from the user,
    - responsive to receiving the first input, retrieve first document-related structure data from the memory, the,
    - display on the device an outline having a primary level of information based on at least a portion of the first document-related structure data corresponding to the first content zoom level, the outline replacing the display of at least the first portion of the document,
    - receive a second input from the user,
    - retrieve second document-related structure data from the memory, and
    - responsive to receiving the second input, display on the device a secondary level of information within the displayed outline based on at least a portion of the second document-related structure data,
    - wherein the first and second document-related structure data being derived from text within the document corresponding to at least one of a heading, a title or a table of contents.

9. The system of claim 8, wherein the device further comprises a touch screen, and
- wherein the touch screen is configured to detect two fingers simultaneously touching the touch screen.

10. The system of claim 8, wherein the central processing unit is configured to display the first portion of the document on the display in a content viewing mode and display the document-related structure data in a structure viewing mode.

11. The system of claim 10, wherein the device further comprises a touch screen, and
- wherein the central processing unit is configured to
    - switch to the content viewing mode from the structure viewing mode in response to user input selecting a portion of the document-related structure data, and
    - switch to the structure viewing mode from the content viewing mode when detecting two fingers simultaneously touching the touch screen.

12. The system of claim 8, wherein the device further comprises a touch screen, and an accelerometer detecting the user touching the touch screen.

13. One of an optical disk, a magnetic storage device or a solid state memory having computer-executable instructions stored thereon that, when executed by a central processing unit, cause the central processing unit to:
- present at least a portion of a document at a first content zoom level on a display of a device;
- receive a first input from a user, the first input comprising a pinching movement input to the device requesting to change from a content view to a structure view;
- responsive to receiving the first input, retrieve document-related structure data from a memory of the user device, the document-related structure data being derived from text within the document corresponding to at least one of a heading, a title or a table of contents;
- display on the display of the device an outline having a primary level of information based on at least a first portion of the document-related structure data corresponding to the first content zoom level, the outline replacing the presentation of at least the portion of the document;
- receive a second input from the user requesting to display a secondary level of information based on at least a second portion of the document-related structure data; and
- display on the display of the device the secondary level of information within the displayed outline in response to receiving the request of the second input from the user.

14. The optical disk, magnetic storage device or solid state memory of claim 13, further comprising instructions causing the central processing unit to:
- prior to receiving the input from the user requesting to change from a content view to a structure view, receive a third input from the user requesting to zoom-out from the document; and
- display in response to the third input a second portion of the document, wherein the second portion is a superset of the portion of the document.

15. The optical disk, magnetic storage device or solid state memory of claim 14, wherein the device further comprises a touch screen, and
- further comprising instructions causing the computer to ascertain that the third input from the user requesting to zoom-out from the document comprises a pinching motion of two fingers touching the touch screen.

16. The optical disk, magnetic storage device or solid state memory of claim 13, wherein the device further comprises a touch screen, and
- further comprising instructions causing the computer to interpret touching of two fingers simultaneously on the touch screen as the first input from the user requesting to change from the content view to the structure view.

* * * * *